(12) United States Patent
Shirahama (10) Patent No.: US 7,981,569 B2
(45) Date of Patent: Jul. 19, 2011

(54) FUEL CELL

(75) Inventor: Junichi Shirahama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 217 days.

(21) Appl. No.: 12/444,256

(22) PCT Filed: Oct. 23, 2007

(86) PCT No.: PCT/JP2007/070975
§ 371 (c)(1),
(2), (4) Date: Apr. 3, 2009

(87) PCT Pub. No.: WO2008/050884
PCT Pub. Date: May 2, 2008

(65) Prior Publication Data
US 2010/0003580 A1 Jan. 7, 2010

(30) Foreign Application Priority Data

Oct. 24, 2006 (JP) ................................. 2006-289001

(51) Int. Cl.
*H01M 8/02* (2006.01)
*H01M 8/10* (2006.01)
(52) U.S. Cl. .................... 429/510; 429/492; 429/508
(58) Field of Classification Search .................... 429/510
See application file for complete search history.

(56) References Cited

U.S. PATENT DOCUMENTS 6,495,278 B1 * 12/2002 Schmid et al. ................ 429/465
2002/0187384 A1 * 12/2002 Kato et al. ...................... 429/35

FOREIGN PATENT DOCUMENTS

| JP | 61-007572 A | 1/1986 |
| JP | 62-193065 A | 8/1987 |
| JP | UH05/066876 A | 9/1993 |
| JP | 11-312528 | * 11/1999 |
| JP | 11-312528 A | 11/1999 |
| JP | 2000-048832 A | 2/2000 |
| JP | 2000-323149 A | 11/2000 |
| JP | 2002-083614 A | 3/2002 |
| JP | 2002-367631 A | 12/2002 |
| JP | 2003-077499 A | 3/2003 |
| JP | 2004-165043 A | 6/2004 |
| JP | 2004-185811 A | 7/2004 |

* cited by examiner

*Primary Examiner* — John S Maples
(74) *Attorney, Agent, or Firm* — Kenyon & Kenyon LLP (57) ABSTRACT

A fuel cell in which protrusion of an adhesive agent into a gas communication path is suppressed. The fuel cell has a gas passage in a power generation region, a manifold in a non power generation region, and the gas communication path interconnecting the gas passage and the manifold. The adhesive agent is used near at least the gas communication path. An adhesive agent accumulation section for suppressing inflow of the adhesive agent into the gas communication path is located near the gas communication path.

10 Claims, 7 Drawing Sheets

FUEL CELL

This is a 371 national phase application of PCT/JP2007/070975 filed 23 Oct. 2007, which claims priority to Japanese Patent Application No. 2006-289001 filed 24 Oct. 2006, the contents of which are incorporated herein by reference.

TECHNICAL FIELD

The present invention relates to a fuel cell in which an adhesive agent is used.

BACKGROUND ART

Heretofore, a unit cell of a solid polymer type fuel cell is constituted of a membrane electrode assembly (MEA) including an electrolytic film and a pair of electrodes between which the electrolytic film is sandwiched, and a pair of separators between which the MEA is sandwiched (e.g., see Japanese Patent Application Laid-Open No. 2002-367631). Each separator of the unit cell is provided with supply manifolds and discharge manifolds of oxidizing gas and fuel gas. In an oxidizing gas passage of one separator, the oxidizing gas flows from the supply manifold to the discharge manifold. In a fuel gas passage of the other separator, the fuel gas flows from the supply manifold to the discharge manifold.

A portion between the pair of separators and a portion between the separator and the electrolytic film are sealed with a liquid gasket (an adhesive agent) provided along the outer periphery of the unit cell. In each separator, accumulation sections are formed in both the inner peripheral portion and the outer peripheral portion of a seal face with which is provided with the adhesive agent. The accumulation sections prevent the adhesive agent from protruding into the manifolds or out of the unit cell and the like during a manufacturing process of the unit cell.

DISCLOSURE OF THE INVENTION

Parts other than the above manifolds and the like also sometimes have problems due to the protrusion of an adhesive agent. However, heretofore this respect has not sufficiently been investigated. Therefore, the adhesive agent might flow into a gas communication path which connects the manifold to a gas passage, to close the gas communication path.

An object of the present invention is to provide a fuel cell capable of suppressing the protrusion of the adhesive agent to the gas communication path.

To achieve the above object, a fuel cell of the present invention comprises a gas passage in a power generation region; a manifold in a non power generation region; a gas communication path interconnecting the gas passage and the manifold, an adhesive agent being used near at least the gas communication path; and an adhesive agent accumulation section which is located near the gas communication path to suppress inflow of the adhesive agent into the gas communication path.

With this constitution, even if the necessary or more amount of the adhesive agent is used near the gas communication path, the adhesive agent accumulation section can preferably suppress the protrusion of the adhesive agent into the gas communication path. In consequence, the decrease of the passage area of the gas communication path or the closing of the path can be suppressed.

According to one preferable configuration of the present invention, the fuel cell comprises a seal groove which is located near at least the gas communication path and in which the adhesive agent is provided. The seal groove communicates with the adhesive agent accumulation section so that the adhesive agent flows through the seal groove and the adhesive agent accumulation section.

With this constitution, even when the excessive adhesive agent overflows from the seal groove, the adhesive agent can be allowed to flow from the seal groove to the adhesive agent accumulation section.

According to one preferable configuration of the present invention, the adhesive agent accumulation section is a groove deeper than the seal groove.

With this constitution, even when a large amount of adhesive agent overflows from the seal groove, the adhesive agent can preferably be received in the adhesive agent accumulation section.

According to one preferable configuration of the present invention, the fuel cell comprises a first member provided with at least the adhesive agent accumulation section and the seal groove; and a second member laminated on the first member and bonded to the first member by the adhesive agent. The first member has a communicating portion formed between the adhesive agent accumulation section and the seal groove so that the adhesive agent flows between the adhesive agent accumulation section and the seal groove, and a support portion which supports the second member.

Originally, the adhesive agent accumulation section is a region which is not filled with the adhesive agent, and hence a gap may be made between the adhesive agent accumulation section and the second member. Therefore, when an external force is applied to the second member, a large stress acts on the second member owing to this gap, and the second member might be deformed. According to the present invention, however, the support portion having the above constitution functions as a backup member for the second member, so that the deformation of the second member can be suppressed. Moreover, since the communicating portion is provided between the adhesive agent accumulation section and the seal groove, the flowing of the adhesive agent to the adhesive agent accumulation section can be secured.

According to one preferable configuration of the present invention, the first member is a frame-like member which supports a part of an MEA, and the second member is a separator provided with the gas passage.

In consequence, at the position of the adhesive agent accumulation section of the frame-like member, the separator can be prevented from being deformed, and additionally, the flowing of the gas through the gas communication path and the gas passage can be secured.

According to another preferable configuration of the present invention, the fuel cell comprises a third member laminated on the second member on a side opposite to the first member, and a seal member with which a portion between the second member and the third member is sealed. A part of the seal member is disposed at a position corresponding to the support portion and deviating from the communicating portion in the laminating direction of the first, second and third members.

If a part of the seal member is disposed at a position deviating from the support portion of the first member and corresponding to the communicating portion, an external force in the laminating direction might deform the second member to close the communicating portion. However, according to the above constitution of the present invention, even if the external force in the laminating direction is applied, the deformation of the second member can be suppressed by the support portion, and the passage area of the communicating portion can be secured.

According to one preferable configuration of the present invention, the first and second members are members constituting a first unit cell, and the third member is a member constituting a second unit cell.

With this constitution, while suppressing the protrusion of the adhesive agent into the gas communication path and the deformation of the second member, the unit cells can be laminated.

According to one preferable configuration of the present invention, the adhesive agent accumulation sections are positioned on both sides of the gas communication path, and extend in the same direction as a gas flow direction in the gas communication path.

With this constitution, on both the sides of the gas communication path, the protrusion of the adhesive agent into the gas communication path can be suppressed.

BEST MODE FOR CARRYING OUT THE INVENTION

Hereinafter, a fuel cell according to a preferable embodiment of the present invention will be described in accordance with an example of a solid polymer type fuel cell suitable for a vehicle with reference to the accompanying drawings. A fuel cell system including the fuel cell can be mounted on not only a vehicle but also a self-propelled mobile body such as a ship, an airplane or a robot, and can be used as a stational power generation system.

First Embodiment

Figure 1:
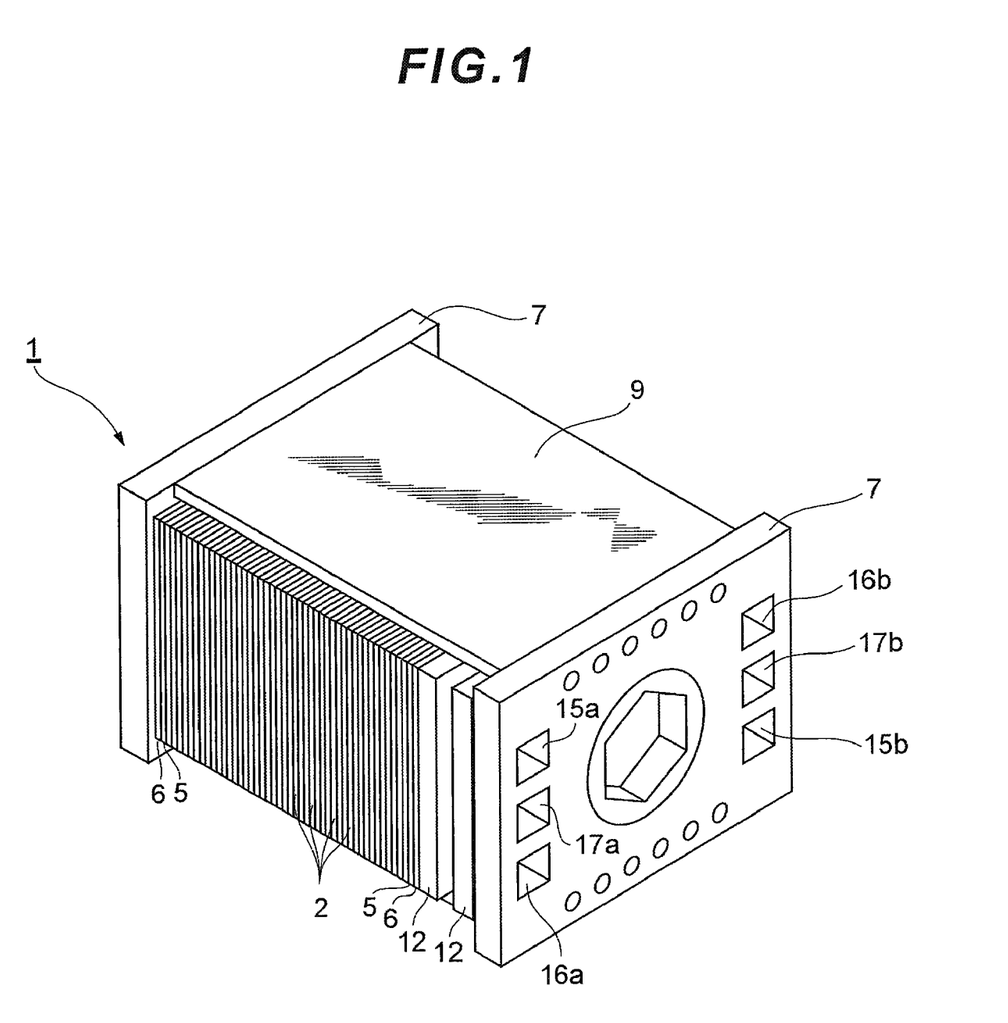
FIG. 1 is a perspective view showing a fuel cell according to a first embodiment.

As shown in FIG. 1, a fuel cell 1 has a laminate stack structure in which a large number of unit cells 2 as basic units are laminated. The fuel cell 1 has a constitution in which collector plates 5, insulating plates 6 and end plates 7 are successively arranged outside the unit cells 2 positioned at both ends of the stack structure. For example, the end plates 7, 7 are connected to each other by a tension plate 9, and the fuel cell 1 comes into a state in which a predetermined compressive load is applied to the laminating direction of the unit cells 2. A pair of plate-like members 12, 12 sandwich therebetween an elastic module including, for example, a coil spring which exerts a fastening force (the compressive load) to the fuel cell 1.

Fuel gas, oxidizing gas and refrigerant are supplied into the fuel cell 1 from supply ports 15a, 16a and 17a of the end plate 7, to flow in the cell laminating direction and to flow in the planar direction of the unit cells 2. Afterward, the fuel gas, the oxidizing gas and the refrigerant are discharged from the fuel cell 1 through discharge ports 15b, 16b and 17b of the end plate 7.

Here, the fuel gas is a hydrogen gas (an anode gas) including hydrogen. Moreover, the oxidizing gas is a gas (a cathode gas) containing an oxidizing agent typified by oxygen. The fuel gas and the oxidizing gas are sometimes generically referred to as a reactant gas. The refrigerant is, for example, cooling water.

Figure 2:
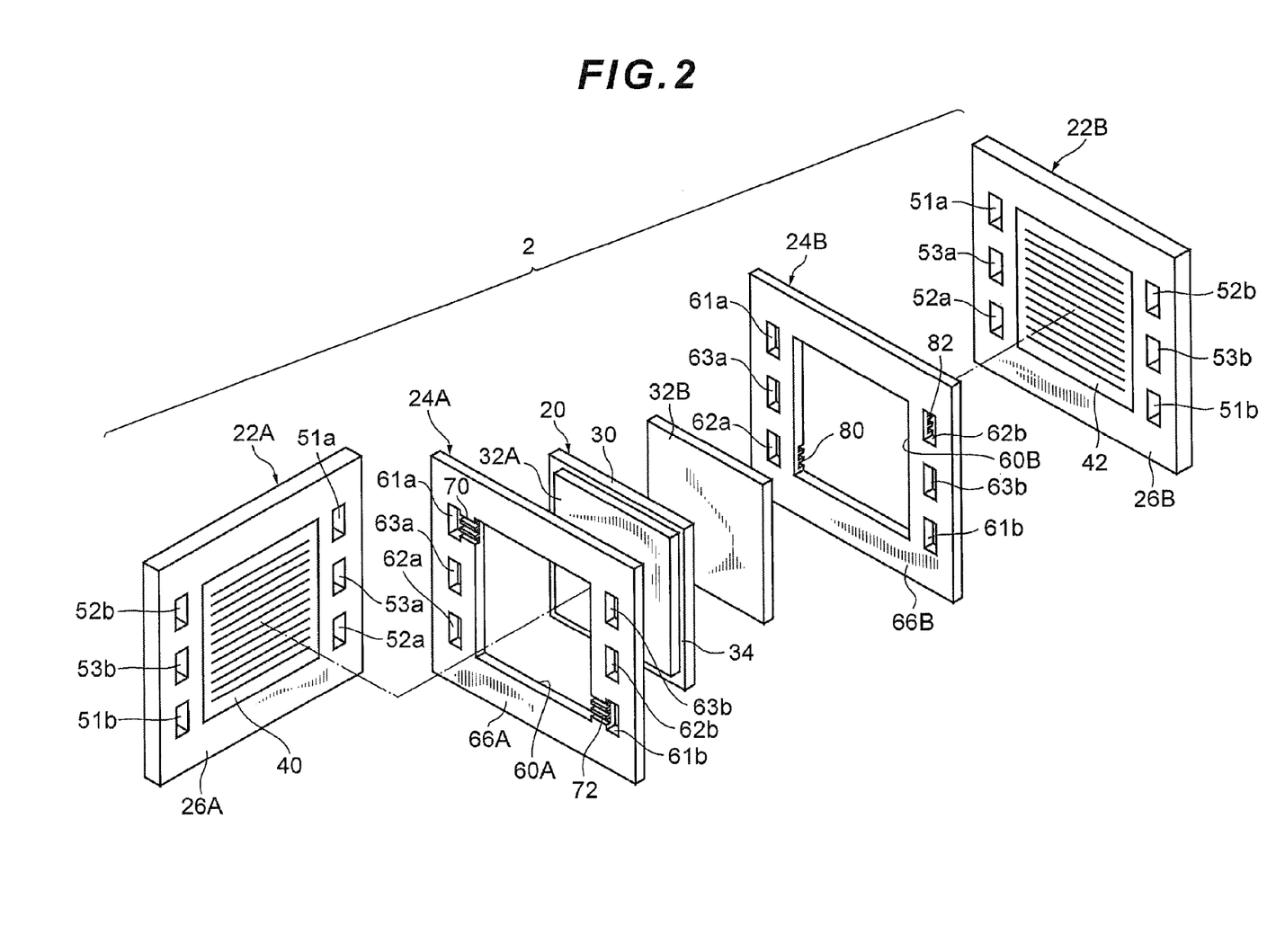
FIG. 2 is an exploded perspective view showing a unit cell of the fuel cell according to the first embodiment.

As shown in FIG. 2, each unit cell 2 includes an MEA 20, a pair of separators 22A, 22B, and a pair of resin frames 24A, 24B. In the unit cell 2, the separator 22A, the resin frame 24A, the MEA 20, the resin frame 24B and the separator 22B are laminated in this order. Furthermore, the outer peripheral edges of these members are bonded by an adhesive agent in a manufacturing process, and portions among the members are sealed.

The MEA 20 (the membrane-electrode assembly) is constituted of an electrolytic film 30, and a pair of electrodes 32A, 32B (an anode and a cathode) between which the electrolytic film 30 is sandwiched.

The electrolytic film 30 is formed of an ion exchange membrane. The electrolytic film 30 has a function of moving hydrogen ions supplied from the fuel gas, from the electrode 32A to the electrode 32B. The electrolytic film 30 is formed to be larger than the electrodes 32A, 32B, and joined to the electrodes 32A, 32B while leaving a peripheral edge 34 by, for example, a hot press process.

Figure 3:
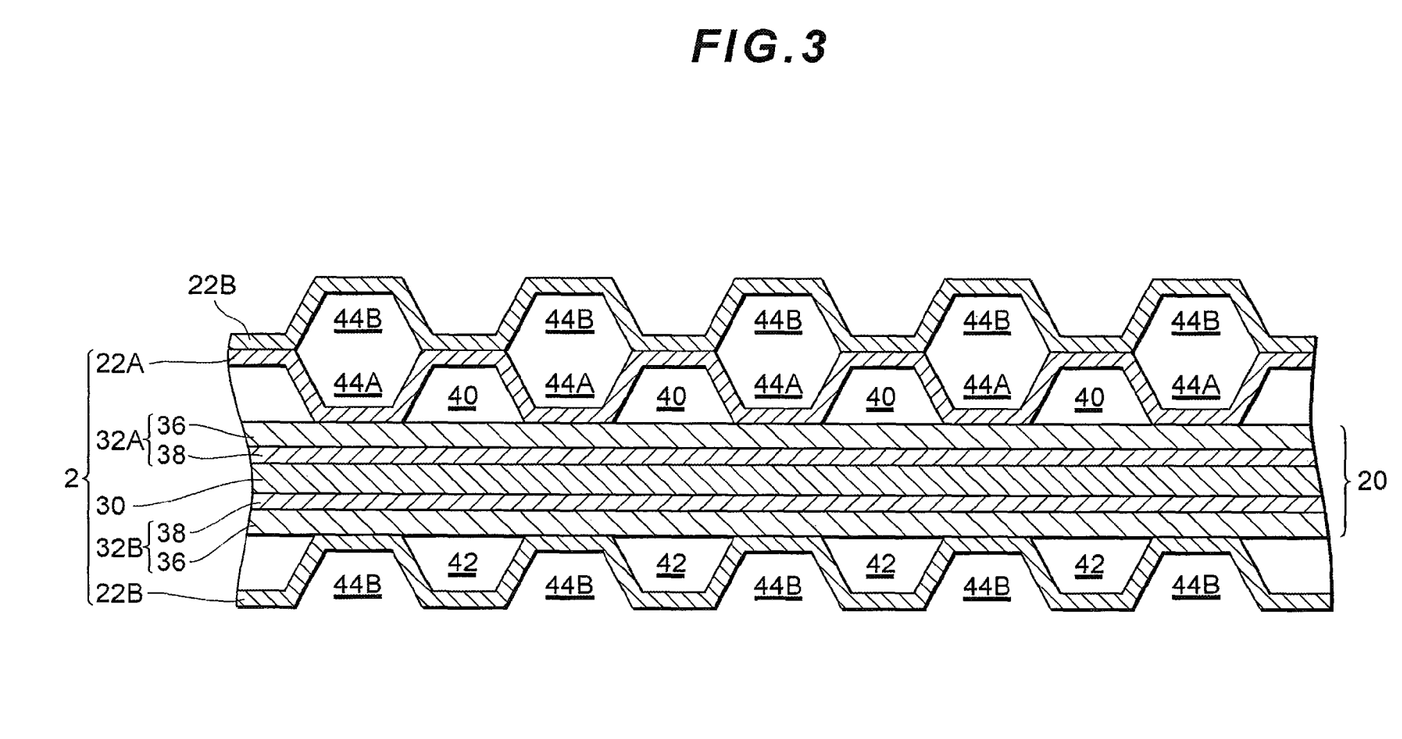
FIG. 3 is a sectional view showing the unit cell of the fuel cell according to the first embodiment.

As shown in FIG. 3, each of the electrodes 32A, 32B is constituted of a diffusion layer 36 and a catalyst layer 38. The diffusion layer 36 is made of, for example, a porous carbon material. As the catalyst of the catalyst layer 38, for example, platinum is preferably used, and the catalyst layer 38 is connected to the diffusion layer 36.

The diffusion layer 36 of the electrode 32A faces a fuel gas passage 40 of the separator 22A, and has a function of passing the fuel gas and a function of electrically connecting the catalyst layer 38 to the separator 22A. On the other hand, the diffusion layer 36 of the electrode 32B faces an oxidizing gas passage 42 of the separator 22B, and has a function of passing the oxidizing gas and a function of electrically connecting the catalyst layer 38 to the separator 22B.

The separators 22A, 22B are made of a conductive material impermeable to the gas. Examples of the conductive material include carbon, a hard resin having conductivity, and additionally metals such as aluminum and stainless steel. In the present embodiment, the separators 22A, 22B are so-called metal separators each including a base material made of a plate-like metal. The face of the base material facing the electrode 32A or 32B may be coated with a film having a corrosion resistance more excellent than that of the base material.

The separator 22A has the fuel gas passage 40 on the surface thereof, and a refrigerant passage 44A on the backside thereof. The separator 22B has the oxidizing gas passage 42 on the surface thereof, and a refrigerant passage 44B on the backside thereof. The fuel gas passage 40, the oxidizing gas passage 42 and the refrigerant passage 44A, 44B are formed as a plurality of groove-like passages which are straight passages in which a concavo-convex repeat extend in one direction. However, these passages may be serpentine passages halfway having return portions.

The fuel gas passage 40 supplies the fuel gas to the electrode 32A. The oxidizing gas passage 42 supplies the oxidizing gas to the electrode 32B. The fuel gas flowing through the fuel gas passage 40 and the oxidizing gas flowing through the oxidizing gas passage 42 cause an electrochemical reaction in the MEA 20 to obtain the electromotive force of the unit cell 2. In two adjacent unit cells 2, 2, the refrigerant passage 44A of one of the unit cells 2 communicates with the refrigerant passage 44B of the other unit cell 2. In consequence, the passage for supplying the refrigerant is formed between the unit cells 2 and 2. The refrigerant decreases the heat of the unit cells 2 generated by the electrochemical reaction, and suppresses the temperature rise of the fuel cell 1.

The fuel gas passage 40 and the refrigerant passage 44A on both the surfaces of the separator 22A are simultaneously formed by a press forming of the separator 22A, and the oxidizing gas passage 42 and the refrigerant passage 44B on both the surfaces of the separator 22B are simultaneously formed by a press forming of the separator 22B. That is, the separators 22A, 22B have such a relation that concavo-convex shapes constituting fluid passages are reversed on the surface and the backside.

The separators 22A, 22B have a rectangular shape in planar view. The separators 22A, 22B have peripheral edges 26A, 26B around the fuel gas passage 40 and the oxidizing gas passage 42.

In one side portion of each of the peripheral edges 26A, 26B, manifolds 51a, 52a and 53a on the supply side of the fuel gas, the oxidizing gas and the refrigerant are formed to extend through the one side portion. Moreover, in the other side portion of each of the peripheral edges 26A, 26B, manifolds 51b, 52b and 53b on the discharge side of the fuel gas, the oxidizing gas and the refrigerant are formed to extend through the other side portion. These manifolds 51a to 53a and 51b to 53b communicate with the supply ports 15a to 17a and the discharge ports 15b to 17b of the above end plates 7 so as to correspond to fluids such as the fuel gas, the oxidizing gas and the refrigerant.

The resin frames 24A, 24B are formed into a frame-like shape. The resin frames 24A, 24B sandwich therebetween at least a part of the MEA 20, for example, the peripheral edge 34 from the front side and the back side thereof. Moreover, the resin frames 24A, 24B are sandwiched together with the MEA 20 between the separators 22A and 22B.

The resin frames 24A, 24B mainly exert a function of holding the MEA 20, a function of a spacer between the separators 22A and 22B for supporting the fastening force, a function of reinforcing the rigidity of the separators 22A, 22B, a function of an insulating member, and a function of introducing and discharging the reactant gas into and from a power generation region.

The resin frames 24A, 24B have openings 60A, 60B for receiving the electrodes 32A, 32B, respectively. The openings 60A, 60B face the fuel gas passage 40 and the oxidizing gas passage 42, respectively. The resin frames 24A, 24B have peripheral edges 66A, 66B around the openings 60A, 60B.

In one side portion of each of the peripheral edges 66A, 66B, manifolds 61a, 62a and 63a on the supply side of the fuel gas, the oxidizing gas and the refrigerant are formed to extend through the one side portion. Moreover, in the other side portion of each of the peripheral edges 66A, 66B, manifolds 61b, 62b and 63b on the discharge side of the fuel gas, the oxidizing gas and the refrigerant are formed to extend through the other side portion. These manifolds 61a, 62a and 63a are aligned with and connected to the manifolds 51a, 52a and 53a in the laminating direction of the unit cells 2, and the manifolds 61b, 62b and 63b are aligned with and connected to the manifolds 51b, 52b and 53b in the laminating direction of the unit cells 2.

Moreover, the peripheral edge 66A is provided with communication paths 70 and 72 on the introduction side and the discharge side of the fuel gas. The communication path 70 on the introduction side communicates to directly open in the manifold 61a and the opening 60A, and the communication path 72 on the discharge side communicates to directly open in the manifold 61b and the opening 60A. Therefore, in the form of the unit cell 2, the communication path 70 connects the manifolds 51a, 61a to the fuel gas passages 40. The communication path 72 connects the manifolds 51b, 61b to the fuel gas passages 40.

Similarly, the peripheral edge 66B is provided with communication paths 80 and 82 on the introduction side and the discharge side of the oxidizing gas. The communication path 80 on the introduction side connects the manifold 62a to the opening 60B. Therefore, in the form of the unit cell 2, the communication path connects the manifolds 52a, 62a to the oxidizing gas passages 42. The communication path 82 on the discharge side connects the manifold 62b to the opening 60B, and hence connects the manifolds 52b, 62b to the oxidizing gas passages 42.

According to such a constitution, for example, the fuel gas introduced into the unit cell 2 flows from the manifold 51a to the manifold 61a, and a part of the gas flows from the manifold 61a through the communication path 70 to flow into the fuel gas passages 40. Afterward, the fuel gas used in the power generation of the MEA 20 flows through the communication path 72 to reach the manifold 61b, and is discharged from the unit cell 2 through the manifold 51b. It is to be noted that the refrigerant is supplied/discharged from the manifolds 53a, 53b to the refrigerant passages 44A, 44B through communication paths (not shown) formed in the separators 22A, 22B.

Here, the "power generation region" and a "non power generation region" for use in claims will supplementarily be described.

The "power generation region" is a region where the unit cell 2 can generate a power, and is specifically a region corresponding to the electrode 32A or 32B. The "power generation region" of the present embodiment includes the fuel gas passage 40 and the oxidizing gas passage 42 of the separators 22A, 22B, and the openings 60A, 60B of the resin frames 24A, 24B.

The "non power generation region" is a region deviating from the above power generation region, that is, a region where the unit cell 2 does not generate any power. In the "non power generation region", the electrodes 32A, 32B are not completely present, or a slight portion of each electrode is present. The "non power generation region" of the present embodiment includes all the above manifolds 51a to 53a, 51b to 53b, 61a to 63a and 61b to 63b.

Figure 4:
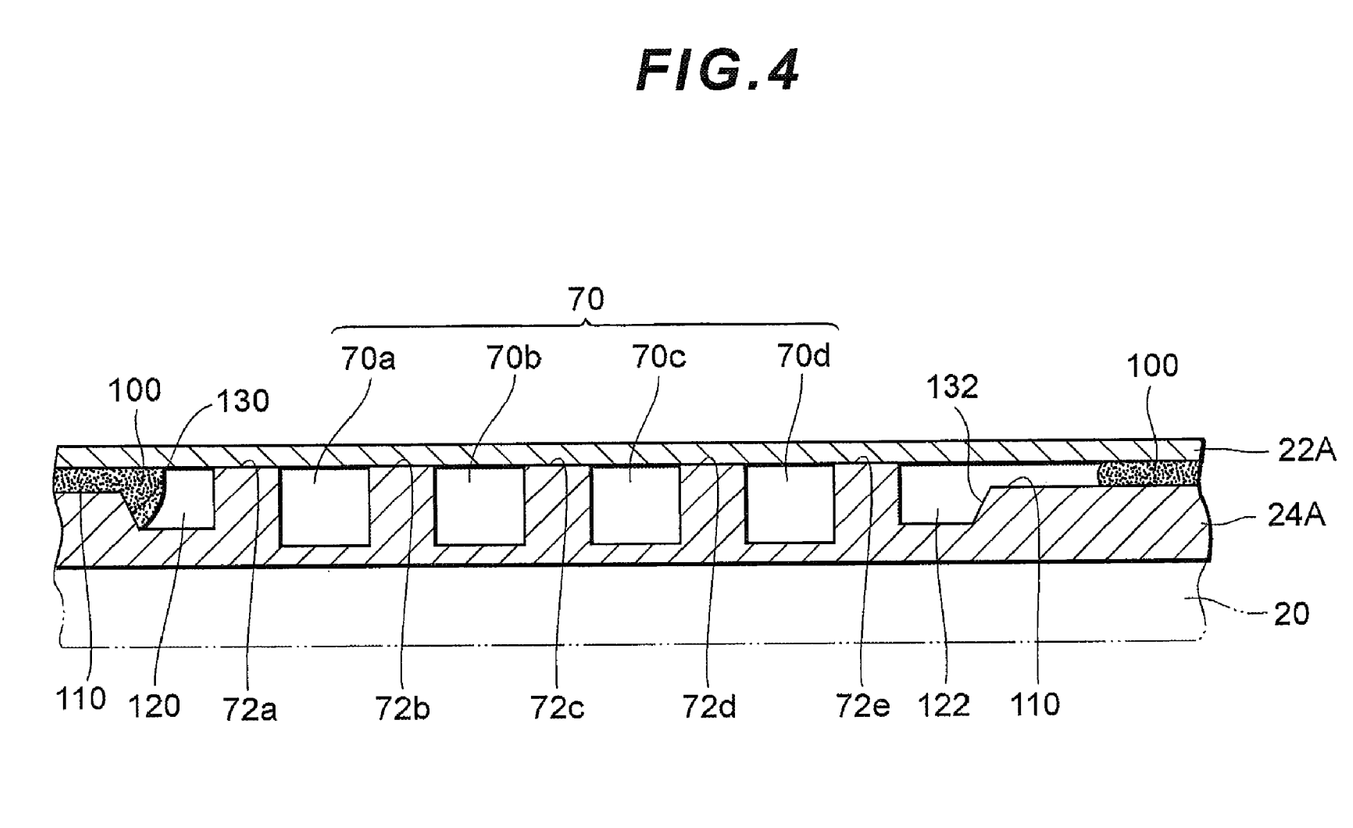
FIG. 4 is a sectional view showing a structure around a gas communication path according to the first embodiment.

Next, a structure around the communication path of the reactant gas will be described in detail with reference to FIG. 4.

As described above, the communication paths of the reactant gas are the communication paths 70, 72 of the fuel gas and the communication paths 80, 82 of the oxidizing gas. The structure around the communication path described hereinafter can be applied to all of these communication paths 70, 72, 80 and 82. Here, the structure around the communication path 70 of the fuel gas will be described as an example.

The communication path 70 is formed into a recessed shape on the surface of the communication path facing the separator 22A. Specifically, the communication path 70 includes a plurality of, for example, four groove-like passages

70*a*, 70*b*, 70*c* and 70*d*. Top faces 72*a*, 72*b*, 72*c*, 72*d* and 72*e* of portions for separating the passages 70*a*, 70*b*, 70*c* and 70*d* from one another come in contact with the face of the separator 22A.

An adhesive agent 100 is provided to peripherally bond the separator 22A to the resin frame 24A over the whole periphery. The adhesive agent 100 is initially, for example, a liquid, and is hardened when heated or left to stand for a predetermined time, to exert a bonding force. The adhesive agent 100 is provided in a seal groove 110 by, for example, coating.

The seal groove 110 is formed in the resin frame 24 so that the seal groove corresponds to a bonding region where the adhesive agent 100 is used. The seal groove 110 is formed near the communication path 70. More specifically, the seal grooves 110 are formed near the outer sides of the passages 70*a*, 70*d* at both ends of the communication path 70.

An accumulation section 120 is formed between the seal groove 110 and the passage 70*a*, and an accumulation section 122 is formed between the seal groove 110 and the passage 70*d*. The accumulation sections 120 and 122 prevent the adhesive agent 100 from flowing into the passages 70*a* and 70*d*.

The accumulation sections 120, 122 are groove-like recessed portions, and extend in the same direction as that of the passages 70*a*, 70*d*. Preferably, one end of each of the accumulation section 120, 122 in an extending direction directly opens in the opening 60A in the same manner as in the communication path 70. The accumulation sections 120, 122 communicate with the seal groove 110 so that the adhesive agent 100 flows through both of them. In consequence, the excessive adhesive agent 100 in the seal groove 110 can be allowed to flow into the accumulation sections 120, 122. Preferably, wall faces 130, 132 of the accumulation sections 120, 122 on the side of the seal groove 110 may tilt so that the adhesive agent 100 can easily flow into the accumulation sections 120, 122.

The accumulation sections 120, 122 have arbitrary depths, but are preferably grooves deeper than the seal groove 110. In consequence, even when a large amount of adhesive agent 100 overflows from the adhesive agent 100, the adhesive agent 100 can be received in the accumulation sections 120, 122, and the protrusion of the adhesive agent 100 into the passages 70*a*, 70*d* can be suppressed. It is to be noted that as in the present embodiment, the groove depths of the accumulation sections 120, 122 may be smaller than the depth of the communication path 70.

As described above, according to the structure around the communication path 70 of the present embodiment, the above accumulation sections 120, 122 are provided. In consequence, even when the necessary amount of the adhesive agent 100 or a larger amount of the adhesive agent 100 is used near the communication path 70, the accumulation sections 120, 122 can prevent the protrusion of the adhesive agent 100 into the communication path 70. Therefore, the decrease of the passage area of the communication path 70 or the closing of the path can be suppressed, and the supply of the fuel gas to the fuel gas passage 40 can be secured.

Second Embodiment

Next, different respects according to a second embodiment will mainly be described with reference to FIGS. 5 to 7. A large difference between the second embodiment and the first embodiment lies in that a backup structure is provided to prevent the deformation of a separator. It is to be noted that in the second embodiment, the same constitution as that of the first embodiment will be denoted with the same reference numerals as those of the first embodiment to omit the description of the second embodiment. Moreover, an example of a structure around an accumulation section 122 will be described, but needless to say, the example is applicable even to a structure around an accumulation section 120.

Figure 5:
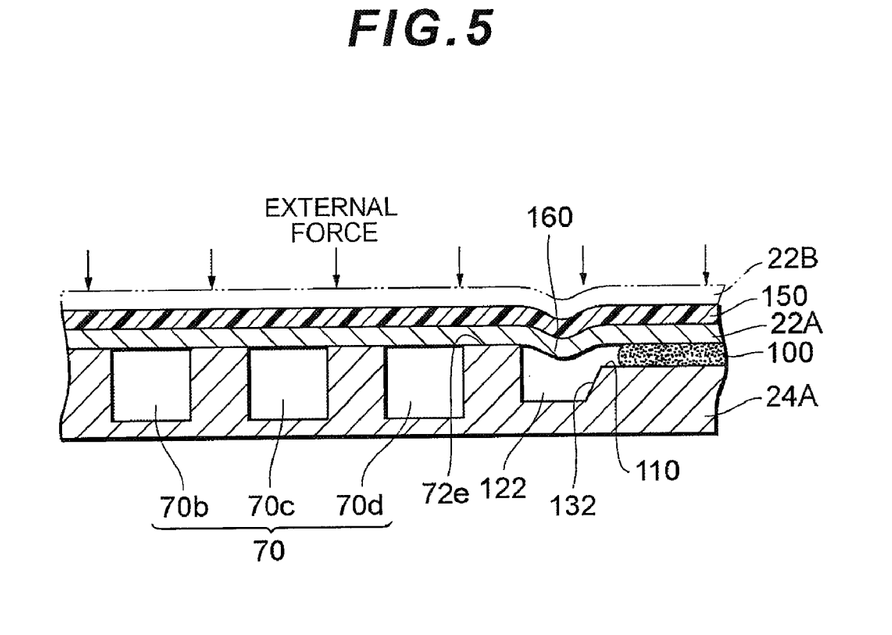
FIG. 5 is a sectional view showing a structure around a gas communication path according to a comparative example.

FIG. 5 is a sectional view showing a structure around a communication path 70 according to a comparative example.

As shown in FIG. 5, a portion between a separator 22A of one unit cell 2 of adjacent cells and a separator 22B of the other unit cell 2 is sealed with a gasket 150 (a seal member). The gasket 150 is disposed at a position corresponding to the communication path 70 in the laminating direction of the unit cells 2. More specifically, the gasket 150 is provided to laterally cross the upside of passages 70*a* to 70*d* of the communication path 70 (it is to be noted that the passage 70*a* is omitted).

As described above, a fuel cell 1 is used while a predetermined compressive load is applied in the laminating direction of the unit cells 2. Therefore, considering from the surface of the separator 22B, an external force shown in FIG. 5 acts on the surface of the separator 22B. By this external force, a large stress can act on a portion 160 of the separator 22A corresponding to the accumulation section 122, and hence the separator 22A might be deformed. A reason why such deformation occurs is that the accumulation section 122 is originally a region which is not filled with an adhesive agent 100, and can be present as a space even after the use of the adhesive agent 100.

Figure 6:
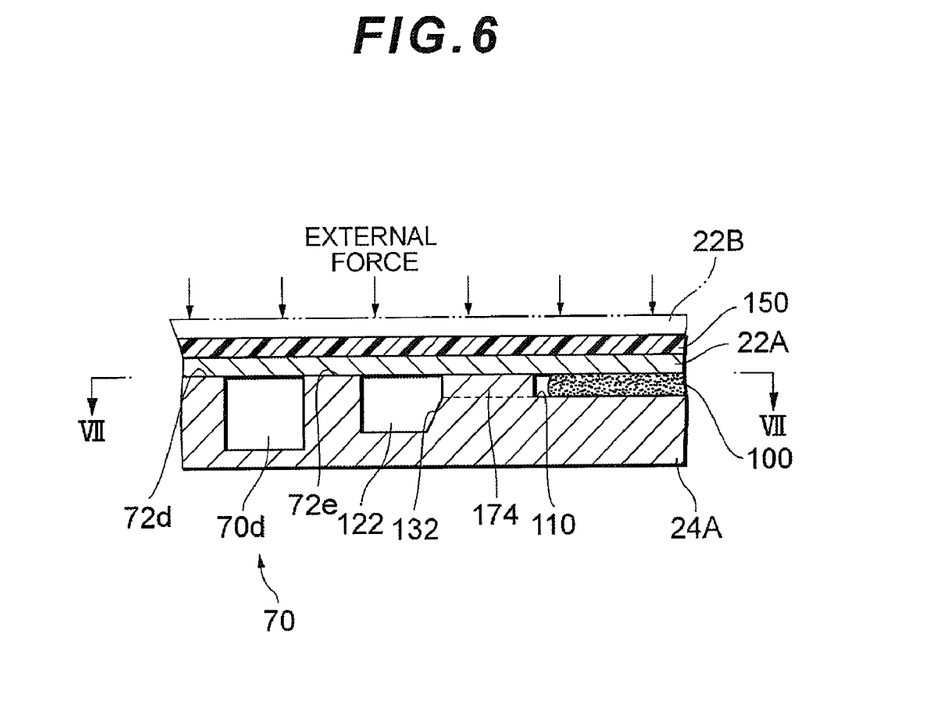
FIG. 6 is a sectional view showing a structure around a gas communication path according to a second embodiment.
Figure 7:
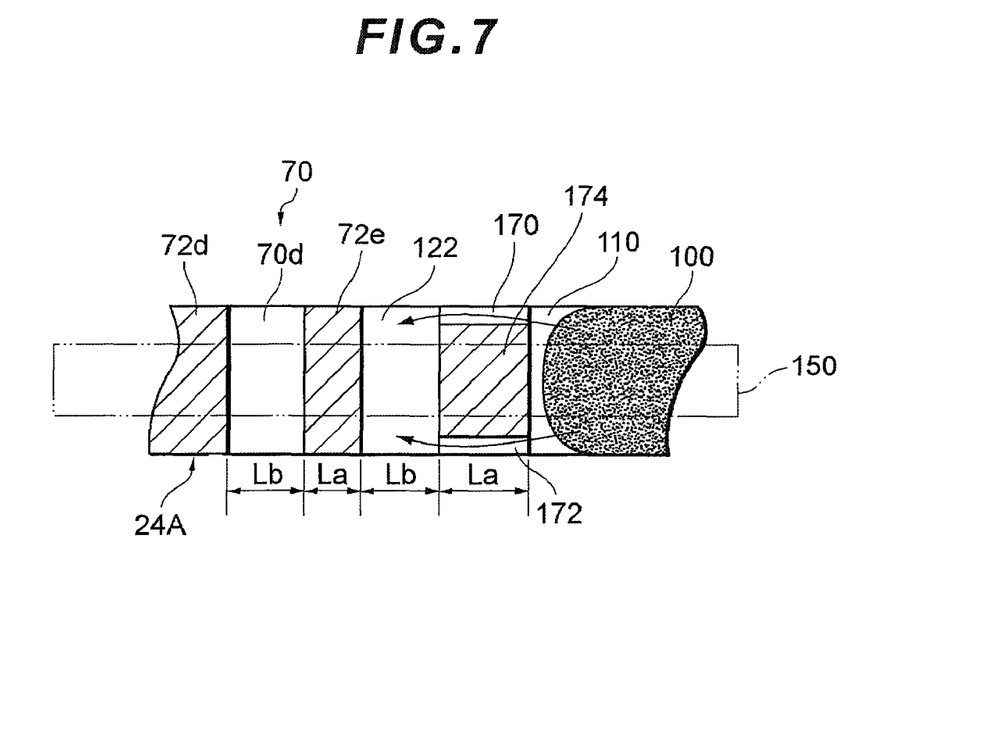
FIG. 7 is a plan view showing a part of a resin frame from the arrow direction of the VII-VII line of FIG. 6, and is a diagram showing a backup structure of a separator.

To solve the problem, in the present embodiment, as shown in FIGS. 6 and 7, the backup structure to prevent the deformation of the separator 22A is provided.

As shown in FIGS. 6 and 7, a resin frame 24A has communicating portions 170, 172 and a support portion 174 between a seal groove 110 and the accumulation section 122.

The communicating portions 170, 172 connect the seal groove 110 to the accumulation section 122 so that the adhesive agent 100 flows between them. The communicating portions 170, 172 are disposed on opposite sides of the support portion 174, and are concave with respect to the separator 22A. The communicating portions 170, 172 have arbitrary groove depths, and the depths may be set to a groove depth equal to that of the seal groove 110. Preferably, the communicating portions 170, 172 may have decline from the side of the seal groove 110 to the side of the accumulation section 122.

The positions, the sizes and the number of the communicating portions 170, 172 may be set to arbitrary values. However, the communicating portions 170, 172 are preferably provided in positions deviating from the position corresponding to the gasket 150 in the laminating direction of the unit cells 2. In other words, it is preferable that the gasket 150 is not arranged right above the communicating portions 170, 172. In this case, even when the external force is applied in the laminating direction of the unit cells 2 and the portion corresponding to the gasket 150 is deformed, the passage areas of the communicating portions 170, 172 do not have to be decreased.

The support portion 174 supports the separator 22A. The top face of the support portion 174 has a height level equal to that of the top faces (e.g., 72*d* and 72*e*) which define the passages of the communication path 70, and comes in contact with the face of the separator 22A. The support portion 174 is provided at the position corresponding to the gasket 150 in the laminating direction of the unit cells 2. In other words, the gasket 150 is arranged right above the support portion 174 to laterally cross the support portion 174. In consequence, the support portion 174 can be provided at a position to which the load is applied through the gasket 150.

Here, the width of the support portion 174 is set to a width La equal to that of the top face 72e, and the width of the passage 70d is set to a width Lb equal to that of the accumulation section 122. A reason why the equal width is set in this manner is as follows. That is, in a case where it is considered that the separator 22A is not deformed at the position corresponding to the communication path 70, when a relation similar to that between the groove width (Lb) and the protruding width (La) in the communication path 70 is provided on both sides of the communication path 70, the deformation of the separator 22A in the portions on both the sides can supposedly be suppressed. According to the design of such an equal width, the support portion 174 effectively functions against the external force, and the deformation of the separator 22A can be suppressed. It is to be noted that the widths of the support portion 174 and the accumulation section 122 can appropriately be designed.

As described above, according to the present embodiment, since the support portion 174 functions as a backup member for the separator 22A, the deformation of the separator 22A between the seal groove 110 and the accumulation section 122 can be suppressed. Moreover, since the communicating portions 170, 172 are provided, the flowing of the adhesive agent 100 from the seal groove 110 to the accumulation section 122 can be secured, and the protrusion of the adhesive agent 100 into the communication path 70 can be suppressed.

Third Embodiment

Figure 8:
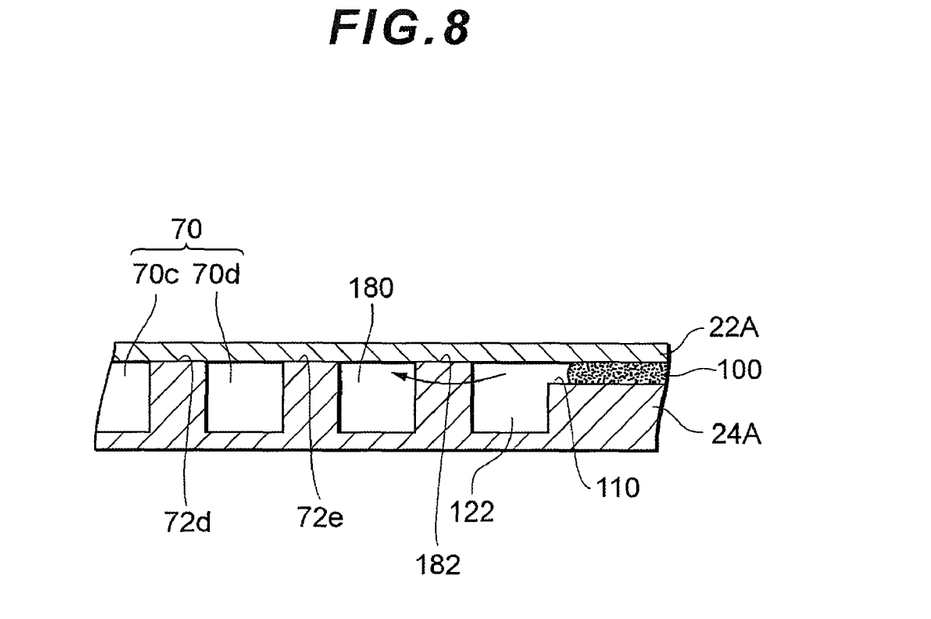
FIG. 8 is a sectional view showing a structure around a gas communication path according to a third embodiment.

Next, different respects according to a third embodiment will mainly be described with reference to FIG. 8. A large difference between the third embodiment and the first embodiment lies in that a dummy groove 180 is provided. It is to be noted that in the third embodiment, the same constitution as that of the first embodiment will be denoted with the same reference numerals as those of the first embodiment to omit the description of the third embodiment. Moreover, an example of a structure around an accumulation section 122 will be described, but needless to say, the example is applicable even to a structure around an accumulation section 120.

The dummy groove 180 is provided between a passage 70d at the end of a communication path 70 and the accumulation section 122. The dummy groove 180 substantially has the same shape as that of the passage 70d, but has a length different from that of the passage. That is, the dummy groove 180 extends in the same direction as that of the passage 70d to such an extent that the dummy groove does not directly open in a manifold 61a or an opening 60A. The width of the dummy groove 180 may be set to a width equal to that of the accumulation section 122 or the passage 70d. A top face 182 of a protruding portion which defines the dummy groove 180 and the accumulation section 122 comes in contact with a separator 22A. The width of the top face 182 may be set to a width equal to that of a top face 72e.

The advantageous effect of the present embodiment different from that of the first embodiment lies in that even when an excessive adhesive agent 100 is applied, the protrusion of the adhesive agent into the communication path 70 can securely be prevented by the dummy groove 180. This means that a slightly large amount of the adhesive agent 100 can be applied during an assembling step of unit cells 2.

Fourth Embodiment

Figure 9:
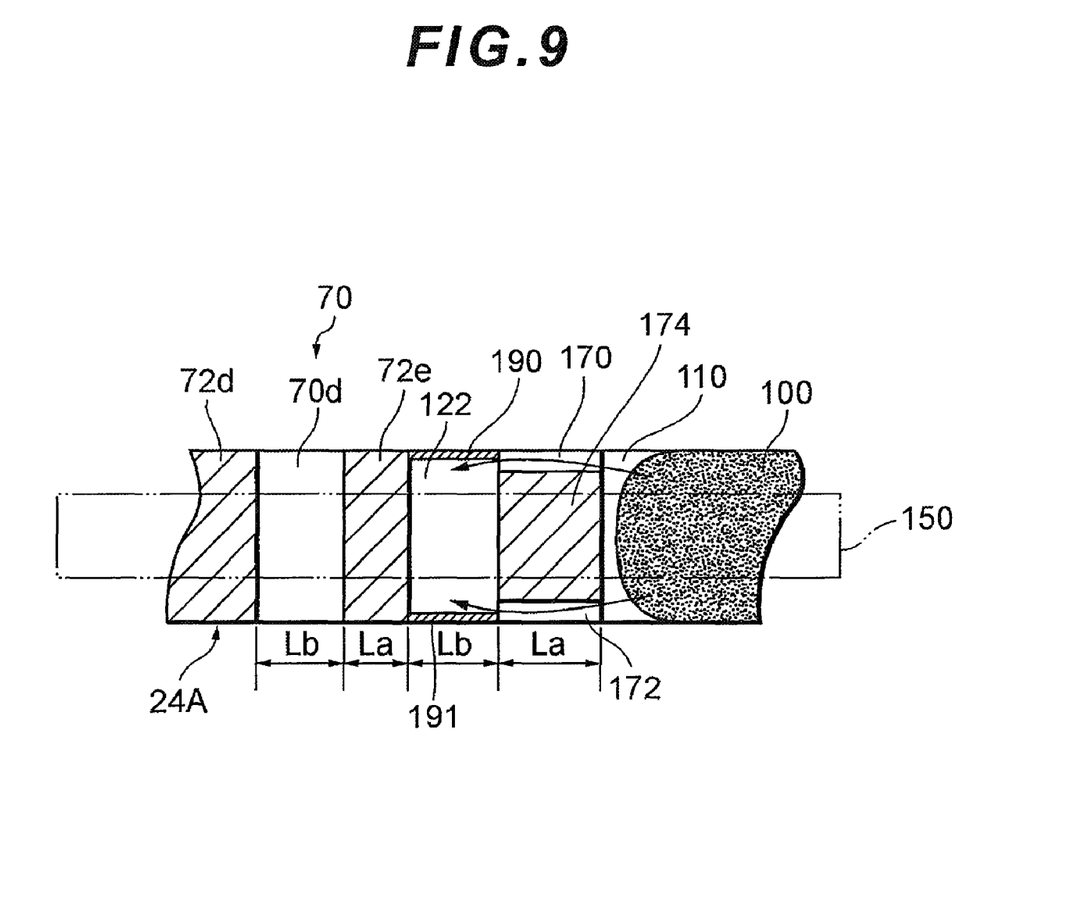
FIG. 9 is a plan view showing a structure around a gas communication path according to a fourth embodiment, the plan view being similar to FIG. 7.

Next, different respects according to a fourth embodiment will mainly be described with reference to FIG. 9. A large difference between the fourth embodiment and the second embodiment lies in that barriers 190, 191 are formed at both ends of an accumulation section 122. The other constitution is common with that of the second embodiment, and hence the description of the constitution is omitted herein.

The barriers 190, 191 are positioned at both the ends of the accumulation section 122 in the extending direction of the accumulation section. The barriers 190, 191 are formed so that the flowing of an adhesive agent 100 from communicating portions 170, 172 to the void space (a space where the adhesive agent 100 can be received) of the accumulation section 122 is not disturbed or is secured.

The barrier 190 is vertically provided from the bottom face of the accumulation section 122 toward a separator 22A to directly close the void space of the accumulation section 122 from a manifold 61a. On the other hand, the barrier 191 is vertically provided from the bottom face of the accumulation section 122 toward the separator 22A to directly close the void space of the accumulation section 122 from an opening 60A. The top faces of the barriers 190, 191 are positioned at a height level equal to that of a top face 72e.

The barriers 190, 191 disturb the flow of fuel gas between the manifold 61a and fuel gas passage 40 through the void space of the accumulation section 122. It is to be noted that the positions of the barriers 190, 191 are not limited to both ends of the accumulation section 122, and can arbitrarily be set. That is, a barrier portion which disturbs the flow of the fuel gas between the manifold 61a and the fuel gas passages 40 through the void space of the accumulation section 122 may be formed in the accumulation section 122.

According to the present embodiment, in addition to the function and the effect of the second embodiment, the adhesive agent 100 accumulated in the accumulation section 122 can be prevented from flowing through the manifold 61a and the fuel gas passages 40. It is to be noted that needless to say, the structure of the present embodiment can be applied even to the structures of the first embodiment and the third embodiment.

<Modification>

The fuel cell 1 according to the above first to third embodiments may be also applied to the following modification.

Instead of the adhesive agent 100, each member of the unit cell 2 may be secured by using a mold material. Even in this case, accumulation sections 120, 122 can prevent the mold material from being supplied into the communication path 70.

The communication paths 70 and 72 for reactant gas, and communication paths 80 and 82 may be formed in separators 22A, 22B. In this case, even the accumulation sections 120 and 122 may be formed in the separators 22A, 22B.

The invention claimed is:

1. A fuel cell, comprising:
   a gas passage in a power generation region;
   a manifold in a non power generation region;
   a gas communication path interconnecting the gas passage and the manifold;
   a seal groove which is located near at least the gas communication path and in which an adhesive agent is provided,
   an adhesive agent accumulation section formed between the seal groove and the gas communication path to suppress inflow of the adhesive agent into the gas communication path;
   a first member provided with at least the adhesive agent accumulation section and the seal groove; and
   a second member laminated on the first member and bonded to the first member by the adhesive agent,
   the first member having:

a communicating portion formed between the adhesive agent accumulation section and the seal groove so that the adhesive agent flows between the adhesive agent accumulation section and the seal groove, and a support portion formed between the adhesive agent accumulation section and the seal groove to support the second member.

2. The fuel cell according to claim 1, wherein the adhesive agent accumulation section is a groove deeper than the seal groove.

3. The fuel cell according to claim 1, wherein the first member is a frame-like member which supports a part of an MEA, and the second member is a separator provided with the gas passage.

4. The fuel cell according to claim 1, further comprising:

a third member laminated on the second member on a side opposite to the first member; and a seal member with which a portion between the second member and the third member is sealed, wherein a part of the seal member is disposed at a position corresponding to the support portion and deviating from the communicating portion in a laminating direction of the first, second and third members.

5. The fuel cell according to claim 4, wherein the first and second members are members constituting a first unit cell, and the third member is a member constituting a second unit cell.

6. The fuel cell according to claim 1, wherein the adhesive agent accumulation section is positioned on both sides of the gas communication path, and extends in the same direction as a gas flow direction in the gas communication path.

7. The fuel cell according to claim 6, wherein both ends of the adhesive agent accumulation section in the extending direction thereof are closed.

8. The fuel cell according to claim 2, wherein the adhesive agent accumulation section is positioned on both sides of the gas communication path, and extends in the same direction as a gas flow direction in the gas communication path.

9. The fuel cell according to claim 3, wherein the adhesive agent accumulation section is positioned on both sides of the gas communication path, and extends in the same direction as a gas flow direction in the gas communication path.

10. The fuel cell according to claim 5, wherein the adhesive agent accumulation section is positioned on both sides of the gas communication path, and extends in the same direction as a gas flow direction in the gas communication path.

* * * * *